(12) United States Patent
Duginske (10) Patent No.: US 12,330,223 B2
(45) Date of Patent: Jun. 17, 2025

(54) POCKET HOLE DRILL GUIDE WITH ANGLED HOLES (71) Applicant: Mark Duginske, Merrill, WI (US)

(72) Inventor: Mark Duginske, Merrill, WI (US)

(*) Notice: Subject to any disclaimer, the term of this patent is extended or adjusted under 35 U.S.C. 154(b) by 0 days.

(21) Appl. No.: 18/385,780

(22) Filed: Oct. 31, 2023

(65) Prior Publication Data
US 2024/0139831 A1   May 2, 2024

Related U.S. Application Data (60) Provisional application No. 63/421,330, filed on Nov. 1, 2022.

(51) Int. Cl.
B23B 47/28 (2006.01)

(52) U.S. Cl.
CPC ........ B23B 47/287 (2013.01); B23B 2247/10 (2013.01); B23B 2247/12 (2013.01)

(58) Field of Classification Search
CPC ............. B23B 47/287; B23B 2247/10; B23B 2247/12
See application file for complete search history.

(56) References Cited

U.S. PATENT DOCUMENTS

| 4,920,846 A | 5/1990 | Duginske |
| 5,493,789 A | 2/1996 | Duginske |
| 5,617,909 A | 4/1997 | Duginske |
| 5,768,966 A | 6/1998 | Duginske |
| 5,791,835 A * | 8/1998 | Chiang ................. B23B 47/287 408/97 |
| 5,895,390 A * | 4/1999 | Moran ............... A61B 17/1778 606/104 |
| 6,880,442 B2 | 4/2005 | Duginske |
| 7,464,737 B2 | 12/2008 | Duginske |
| 7,798,187 B1 | 9/2010 | Duginske |
| 7,930,960 B2 | 4/2011 | Duginske |
| 9,782,837 B2 * | 10/2017 | Pelkey ................. B23B 49/003 |
| 11,020,808 B2 | 6/2021 | Duginske |
| 11,084,106 B2 | 8/2021 | Duginske |
| 11,529,690 B2 * | 12/2022 | Duginske .............. B23B 47/287 |
| 2003/0056631 A1 | 3/2003 | Duginske |
| 2005/0056345 A1 | 3/2005 | Duginske |

(Continued)

FOREIGN PATENT DOCUMENTS

| CA | 2468382 C * | 1/2007 | ........... B23B 47/287 |
| GB | 2346573 A * | 8/2000 | ............. B23B 47/28 |

Primary Examiner — Eric A. Gates
(74) Attorney, Agent, or Firm — Carlin Law LLC (57) ABSTRACT A pocket hole drill guide having a central base member, the pocket hole drill guide having two fifteen-degree guide channels for applying a pocket hole on a workpiece by way of a drill and drill bit. The pocket hole drill guide has a three-tenths inch diameter drill guide and a three hundred seventy-five thousandths inch diameter guide channel on opposing ends of the pocket hole drill central base member, with the exit holes of the guide channels on the same contact face of the central base member. The guide channels intersect at the fifteen-degree angles, so material can be removed from, and a user can quickly alternate between the two sized guide channels for ease of use and rapid production capacity. A multi-slot extrusion is provided which may be mounted to an L-shaped extrusion bracket, making the use of a miter bar optional and the system itself more portable.

12 Claims, 6 Drawing Sheets (56) References Cited

U.S. PATENT DOCUMENTS

| | | | |
|---|---|---|---|
| 2005/0089381 A1* | 4/2005 | Liu | B23B 47/287 |
| | | | 408/115 R |
| 2005/0279200 A1 | 12/2005 | Duginske | |
| 2006/0248998 A1 | 11/2006 | Duginske | |
| 2018/0185930 A1 | 7/2018 | Duginske | |
| 2020/0215623 A1* | 7/2020 | Duginske | B27B 27/00 |
| 2020/0282470 A1* | 9/2020 | Duginske | B27C 5/04 |
| 2022/0212271 A1* | 7/2022 | Poole | B23B 49/005 |

* cited by examiner

POCKET HOLE DRILL GUIDE WITH ANGLED HOLES

CROSS REFERENCE TO RELATED APPLICATION

This application claims the benefit of U.S. Provisional Application 63/421,330, filed Nov. 1, 2022.

FIELD OF THE INVENTION

The present invention relates to jigs and fixtures that are accessories for woodworking machines, and more particularly to aligning and holding a workpiece during a woodworking operation.

BACKGROUND OF THE INVENTION

Woodworking has been prevalent in human civilization dating back to the prehistoric era. Early humans crafted wood into spears, clubs, tools, furniture, and shelters. As civilization advanced into the industrial revolution and modern age, machines were developed to more accurately and efficiently cut and shape wood into the desired shape.

Today, people woodwork to accomplish a wide variety of tasks or projects. Just as in early ages of civilization, humans today woodwork to create furniture, cabinets, art, and toys.

A miter bar is an advancement in woodworking that allows for guiding the workpiece to a desired location accurately, without exposing the human user's appendages or phalanges to a cutting instrument, such as a saw. Typically, a miter bar is a rectangular or a generally T-shaped rod that is typically adjustable and prevents or minimizes wobbling of the workpiece during the cutting process.

Pocket holes are diagonally positioned holes for adhesive, screws, nails, or other attachment methods or devices to angularly attach two pieces of wood. Pocket hole jigs are tools used to create these pocket holes in a quick matter with precision. This allows for a fast and strong joinder. Pocket holes are commonly used in cabinets, frames, and furniture, as well as for other projects where strong joints with semi concealed attachments are desired.

A toggle clamp is a device used to securely hold tools or workpieces in place, or apply pressure thereto. It usually consists of at least a handle, a clamping plate, a pivot, and a toggle rod.

A drill guide block is a tool that helps ensure the accuracy of the placement of drilled holes. The drill guide block can be placed above a desired hole location on a workpiece, a drill bit is inserted into the drill bit shaft of said drill guide block, and then a human user can activate the drill and drill bit thereof, to place a drilled hole within the workpiece. Pocket hole drill guides are guide blocks with pocket hole adaptations therein, such that a human user can place the drill guide on a location and quickly and accurately place a pocket hole.

Many drill guide blocks are portable pieces that are positioned on a surface and held in place by a human user's non-dominant hand while the drill and drill bit thereof are used with the dominant hand. This can lead to accidental misalignment and shifting due to friction and vibration while the drill is activated.

Other drill guides are positioned within a clamp, such as a toggle clamp, a quick action clamp, or a grip clamp. The clamps allow for stability by pressing the drill guide into place with pressure from opposing ends.

Some issues that occur are that operators are required to spend processing time repositioning the drill guide. Also, current designs require clearance for the workpiece, as due to the angles and heights, the workpiece is not able to rest flat on the horizontal plane of a table.

What is needed, therefore, is a device which can utilize the safety of a miter bar, the ease of a pocket hole, and allow for the workpiece to lay flat on the table of a table saw.

BRIEF SUMMARY OF THE INVENTION

The present invention is directed to jigs and fixtures for aligning, guiding and/or holding a workpiece on woodworking machinery during a woodworking operation such as sawing or drilling and are described as well as methods of making, modifying, and using jigs and fixtures.

This patent application is an improved pocket hole drill guide in which a small drill guide block has a 0.375 inch hole and a 0.300 inch hole with a 15-degree pocket hole on sides opposite each other, such that the drill exit holes are on the same face of the drill guide block.

This improved pocket hole drill guide can be used as a single unit or grouped together in a number of different ways which are illustrated in the drawings. Holes in the drill guide body adjacent to the contact face, otherwise known as the exit hole side, of the drill guide allow the small flip stop arm of Duginske U.S. Pat. No. 11,020,808 B2 to be attached directly to the compact drilling unit allowing for fast, accurate, and repeatable placement of the work piece in relationship to the guide block exit holes. The small flip stop arm can be used in both the 0.375 inch hole drilling mode or in the 0.300 inch drilling mode.

This invention described herein provides an improved pocket hole drill guide in which a small drill guide block consists of a central base member, which is an approximately rectangular block consisting of a 0.375 inch hole, also known as a three hundred seventy-five thousandths inch diameter guide channel, and a 0.300 inch hole, also known as a three-tenths diameter guide channel, lined up on opposing faces of the central base member. This positioning allows for drill exit holes to be on the same side of the drill guide block, namely the contact face of the central base member.

By having both drill exit holes on the same face—the contact face—of the central base member, a human user can utilize either guide channel, the 0.375 or the 0.300, without having to spend processing time repositioning the drill guide block, otherwise known as the central base member.

The central base member consists of a first end and a second end. It also consists of a contact face, a top face, and two side walls.

Within the first end of the central base member, the 0.300 inch guide channel is positioned. The guide channel is placed at a fifteen-degree angle through the first end and extends therethrough beyond the central base member and extends out beyond the contact face of the central base member. This 0.300 inch guide channel, allows for a drill bit to pass from the first end of the central base member and extends all the way through the contact face. Thus, the drill bit will remove material of the workpiece at a fifteen-degree angle, and thus create a fifteen-degree pocket hole. This will allow for attachment components, such as screws, nails, or the like to be applied within the workpiece.

Within the second end of the central base member, the 0.375 inch guide channel is positioned. This guide channel is placed at a fifteen-degree angle generally inversely from that of the 0.300 inch guide channel. Thus, the 0.375 inch guide channel extends through the second end and extends therethrough beyond the central base member and extends out beyond the contact face of the central base member. This 0.375 inch guide channel allows for a drill bit to pass from the second end of the central base member and extends all the way through the contact face. Thus, the drill bit will remove material of the workpiece at a fifteen-degree angle, and thus create a fifteen-degree pocket hole. This will allow for attachment components, such as screws, nails, or the like to be applied within the workpiece.

Figures 2A, 2B, 2C, 2D, 2E, 2F, 2G, 2H, 2I:
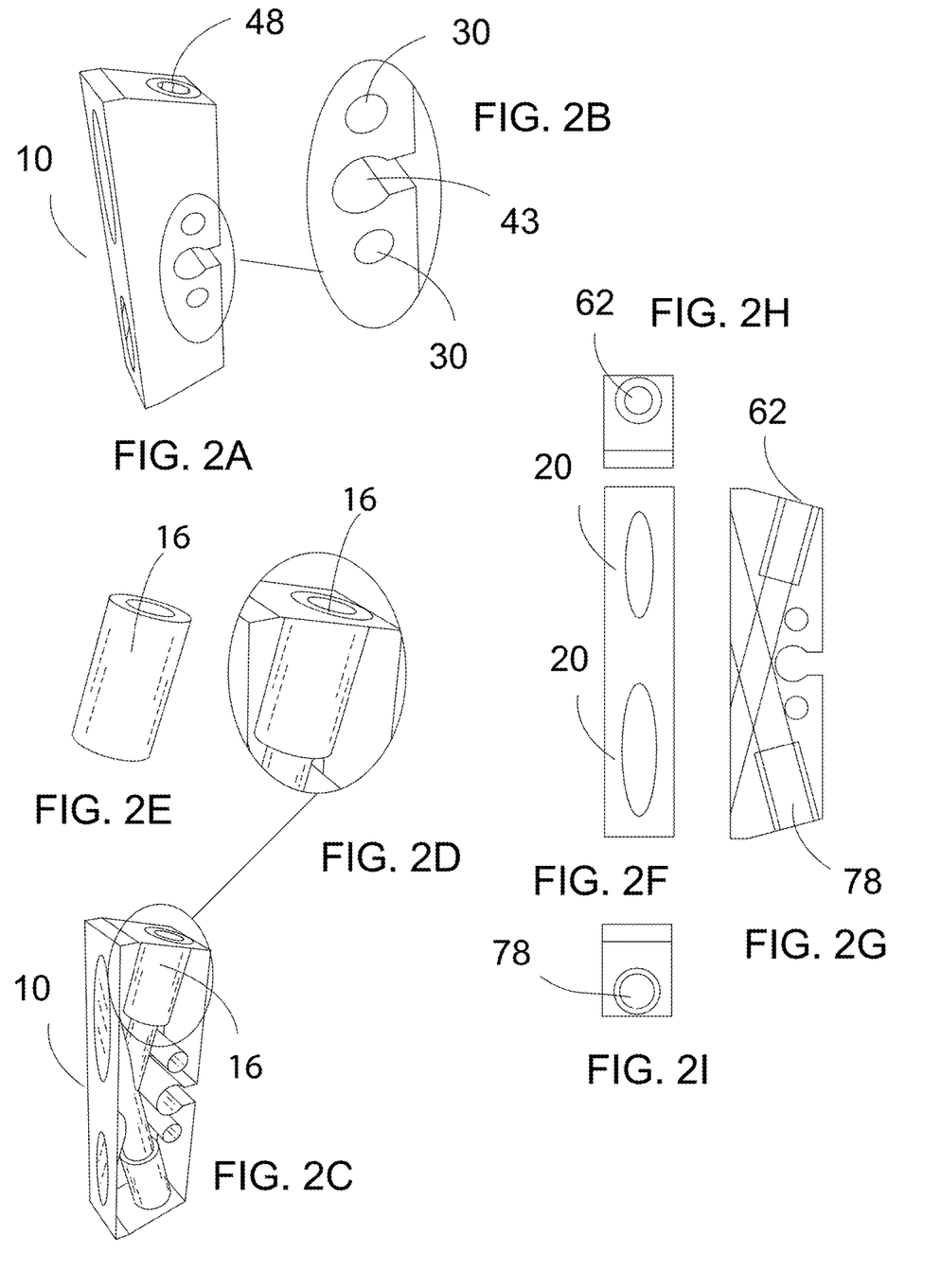
FIG. 2A is a view of the pocket hole drill guide with angled holes of this invention highlighting the enlarged mounting channel with the first and second mounting channel positioned above and below the elongated mounting channel respectively.
FIG. 2B is an enlarged view of FIG. 2A illustrating the mounting channels.
FIG. 2C is a perspective view of the pocket hole drill guide illustrated with one exterior shell removed, highlighting the two guide channels intersecting with each other.
FIG. 2D is an enlarged view of FIG. 2C illustrating a steel bushing.
FIG. 2E illustrates a steel bushing.
FIG. 2F is an end view of the pocket hole drill guide of this invention illustrating the exit holes on the contact face.
FIG. 2G is a cross-sectional side view of the pocket hole drill guide of this invention, illustrating the intersecting guide channels.
FIG. 2H illustrates a steel bushing shown in an end view.
FIG. 2I illustrates a steel bushing shown in an end view.

The two guide channels, the 0.300 guide channel and the 0.375 guide channel, intersect each other, as shown in FIG. 2C. Thus, if a human user desires to use the 0.375 guide channel after using the 0.300 guide channel, they can either reposition the drill and drill bit thereof, or they may reposition the central base member moving from viewing the first end of the central base member to viewing the second end, or from viewing the second end to viewing the first end.

Additionally, steel bushings may be provided within the entrance of the guide channels as shown in FIGS. 2D and 2E. The steel bushings provide durability, and reduce the friction anticipated with repeated use and contact with drill bits during operation. A steel bushing can be placed within the guide channel of the 0.300 guide channel and another steel bushing within the 0.375 guide channel for this purpose.

Further, it is contemplated that an enlarged mounting channel may be positioned within the pocket hole drilling guide central base member extending from the first side wall through the center of the base member and beyond the second side wall, creating a channel therein. Through this enlarged mounting channel, a rod may be inserted within. The rod can be used for securing the pocket hole drill guide to a second pocket hole drill guide.

An L-shaped extrusion bracket may be utilized to further secure the pocket hole drill guide in place. The L-shaped extrusion bracket can be frictionally pressed on one side by a toggle clamp in a horizontal direction so as to contact with the top face of the central base member of the pocket hole drill guide by making contact thereon with a second side of the L-shaped extrusion bracket. The L-shaped extrusion bracket can then be attached to the rod that is positioned within the central base member through the enlarged mounting channel by way of a thumb screw, or a plurality of thumb screws. Thus, the thumb screw is placed on the first side of the L-shaped extrusion bracket, extends therethrough and is attached to the rod.

In such a fashion, utilizing the rod as mentioned prior, two drill guide blocks may be affixed to the L-shaped extrusion bracket, such that a human user may quickly, repeatedly, and accurately apply two pocket holes on a larger workpiece.

Furthermore, should the situation dictate, more drill guide blocks may be attached in a similar fashion with a rod extending through the enlarged mounting channel. Therefore, three, four, or more drill guide blocks may be used as a large functioning pocket hole drilling system. Should a plurality of drill guide blocks be desired, a first mounting channel and a second mounting channel are provided. These mounting channels are placed above and below the enlarged mounting channel as to a longitudinal axis. Within the first and second mounting channels, additional rods are to be inserted, such that the plurality of drill guide blocks have three rods therein, creating a uniform base which is highly resistant to movement due to vibration.

Figure 5A:
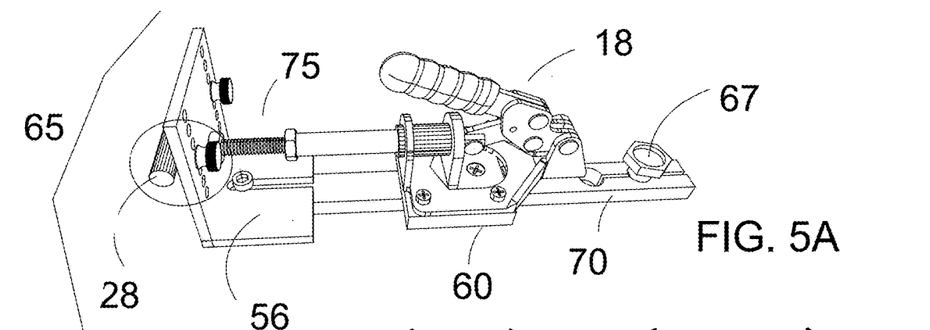
FIG. 5A is a perspective view of the clamping mechanism of a toggle clamp, interacting with a L-shaped extrusion bracket.
Figures 5B, 5C, 5D, 5E, 5F, 5G:
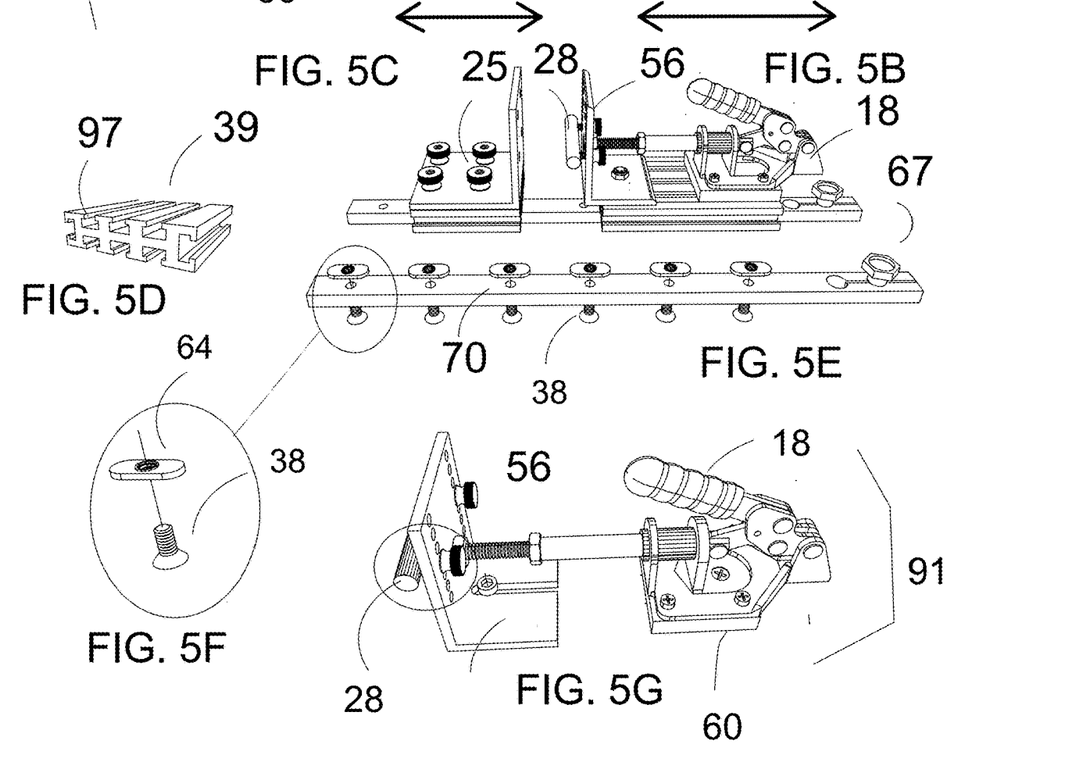
FIG. 5B is a perspective view of the clamping mechanism of a toggle clamp.
FIG. 5C is a perspective view of an L-shaped extrusion which is affixed atop a miter bar with multiple thumb screws.
FIG. 5D is a perspective view of a miter bar that has multiple holes with multiple flat head bolts and flat nuts.
FIG. 5E is a perspective view of a flat head bolt and flat nut.
FIG. 5F is an enlarged view of multi-slot extrusion.
FIG. 5G is a perspective view of a L-shaped extrusion bracket with thumb screws affixed to a multi-slot extrusion.

Additionally, a multi slot extrusion is contemplated as an embodiment of the present invention, as shown in FIG. 5F herein. The multi slot extrusion is also commonly referred to as a T-track or a T-slot extrusion, and is used as a fixture holding device for adjustable and strong placement of a fixture, tool, or workpiece. The present invention discloses that the L-shaped bracket may be affixed to said multi slot extrusion such that the need for a miter bar is now optional.

Notwithstanding the optional nature, a miter bar may be provided for use within the multi slot extrusion. It is thought that the miter bar herein would be a generally rectangular shape with multiple openings therein. The multiple openings will allow for the receipt of attachment mechanisms such as flat head bolts and flat nuts therein, though the specifics of the attachment devices may vary as one with skill in the art would realize. The L-shaped extrusion bracket could optionally attach directly to the miter bar in such a fashion, as shown in FIG. 5C.

These and various other features, advantages, modes, and objects of the present invention will be made apparent from the following detailed description and any appended drawings.

BRIEF DESCRIPTION OF THE DRAWINGS

One or more preferred exemplary embodiments of the disclosed invention are illustrated in the accompanying drawings in which like reference numerals represent like parts throughout.

Before explaining one or more embodiments of the disclosed invention in detail, it is to be understood that this invention is not limited in its application to the details or modes of construction and the arrangement of the components set forth in the following description or previously disclosed illustrations. This invention is capable of multiple embodiments and modes, which can be practiced or carried out in many various ways. Also, it is to be understood that the phraseology and terminology employed herein is for the purpose of description, and should not be regarded as limiting, or used as an absolute.

DETAILED DESCRIPTION OF THE PREFERRED EMBODIMENT

Figures 1A, 1B, 1C, 1D:
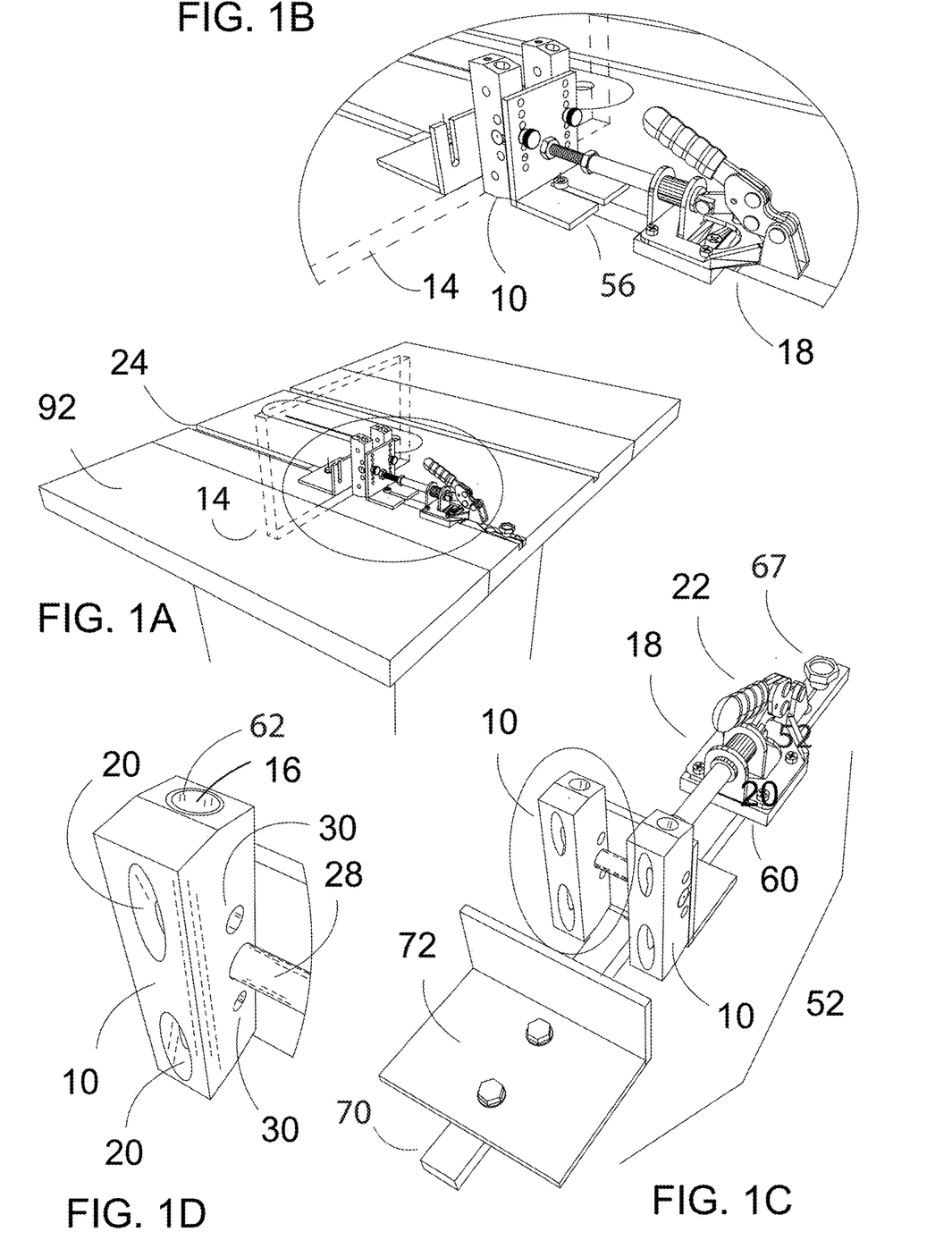
FIG. 1A is a perspective view of the pocket hole drill guide with angled holes of this invention attached to an L-shaped extrusion bracket.
FIG. 1B is an enlarged view of FIG. 1A illustrating the pocket hole drill guide with angled holes.
FIG. 1C is a perspective view of the pocket hole drill guide with angled holes of this invention affixed to an L-shaped extrusion bracket which is located upon a miter bar.
FIG. 1D is an enlarged view of FIG. 1C.

Referring to FIG. 1A-FIG. 1C, a woodworking machinery jig and fixture is disclosed incorporating a dual hole pocket drilling jig system 52. This figure illustrates a perspective view of the pocket hole drill guide 10 of this invention. Two pocket hole drill guides 10 are shown from the contact face 20. Pocket hole drill guides 10 are attached to an L-shaped extrusion bracket 56 which is attached to a miter bar 70. The L-shaped extrusion bracket 56 is loosely secured to the miter bar 70 so it can be moved with the toggle clamp 18 by way of the toggle clamp handle 22. The miter bar 70 is locked in place with the bar locking mechanism 67. The miter head 72 is secured to the miter bar 70 opposite the pocket hole drill guides 10.

Further, this illustrates the pocket hole drill guide 10 which is secured to the L-shaped extrusion bracket 56 by way of a rod 28. The 0.300" guide channel 51 is illustrated at an end of the pocket hole drill guide 10. The 0.300" entry hole of the guide channel 51 is lined with a steel bushing 16. Additionally, it is shown that the dual hole pocket drilling jig system 52 in the miter slot 24 on a table saw top 92. The workpiece 14 is sandwiched between the pocket hole drill guides 10 and the miter head 72.

FIG. 1D is an enlarged view of FIG. 1C illustrating the pocket hole drill guide 10 which is secured to an L-shaped extrusion bracket 56 by way of a rod 28. The pocket hole drill guides 10 are secured to the workpiece 14 for drilling by activating the toggle clamp 18 using the toggle clamp handle 22 as shown in FIG. 1B.

FIG. 2A is a perspective view of the pocket hole drill guide 10 of this invention. It shows the first and second mounting channels 30, as well as the enlarged mounting channel 43. As described above, a rod 28 may be placed within any or all of the mounting channels 30 and the enlarged mounting channel 43 by way of a rod or rods 28 to secure a plurality of pocket hole drill guides 10 into a system, utilizing a plurality of pocket hole drill guides 10.

FIG. 2B is an enlarged view of FIG. 2A illustrating the mounting channels 30 and the enlarged mounting channel 43. The first and second mounting channels 30 are two 0.250" holes extending from the first side wall through the second side wall of the pocket hole drill guide 10 central base member, known as the center of the drill guide itself, and spaced on each side of the enlarged mounting channel 43, which is known as a centered 0.375" hole, and may additionally have a slot opening extending from the first side wall through the second side wall of the pocket hole drill guide 10, creating a channel for the rod 28 to enter and extend therethrough.

FIG. 2C is a perspective view of the pocket hole drill guide 10 with one side removed illustrating the intersections of the guide channels 62, 78. FIG. 2D is an enlarged view of FIG. 2C illustrating a steel bushing 16 within a guide channel. FIG. 2E illustrates a closeup view of the steel bushing 16. FIG. 2F is a view of the contact face 20 of the pocket hole drill guide 10 of this invention, highlighting oblong egg-shaped exit holes so as to create the desired pocket holes. FIG. 2G is a cross-sectional view of the pocket hole drill guide 10 of this invention illustrating the intersectional nature of the guide channels 62, 78. FIG. 2H illustrates the 0.300" diameter guide channel 62 shown in an end view. FIG. 2I illustrates the 0.375" diameter guide channel 78 shown in an end view.

Figure 3A:
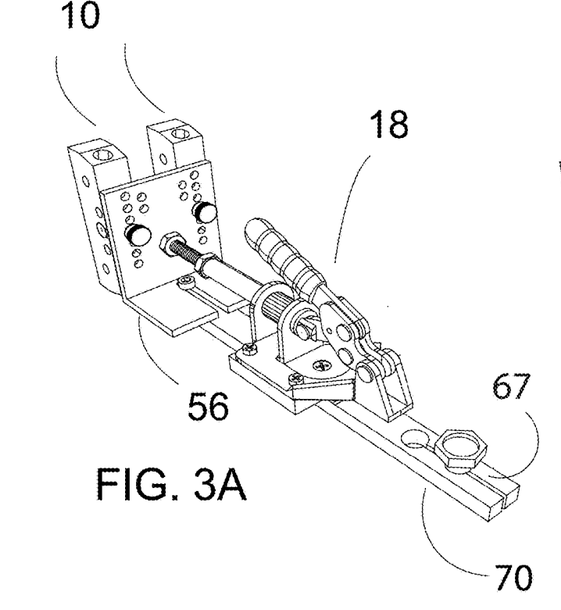
FIG. 3A is a perspective view of the pocket hole drill guide system with two pocket hole drill guides shown from the top face of the drill guides, wherein the drill guides are attached to an L-shaped extrusion by way of thumb screws, all of which is activated with a toggle clamp, which is attached to a miter bar.
Figure 3B:
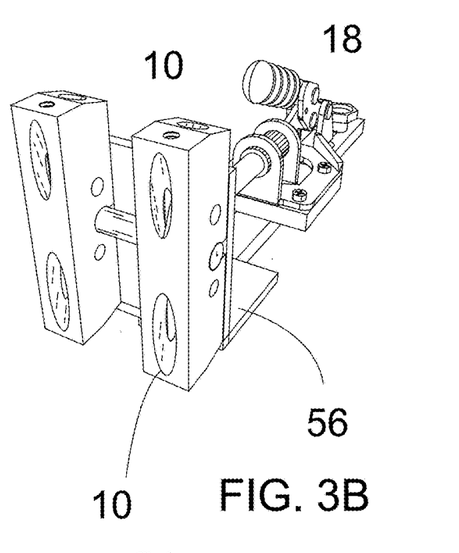
FIG. 3B is a perspective view of FIG. 3A from the contact face position.

Moving now to FIGS. 3A and 3B, these drawings illustrate two pocket hole drill guides 10, utilizing a toggle clamp 18 attached to a miter bar 70 by way of a bar locking mechanism 67. FIG. 3B is a perspective view of the pocket hole drill guides 10 of this invention shown from the contact faces 20, additionally showing a toggle clamp 18 and an L-shaped extrusion bracket 56. The pocket hole drill guides 10 are attached to an L-shaped extrusion 56. This mechanism allows the clamp handle 22 to move the pocket hole drill guides 10 against the workpiece 14 and contact it on the contact faces 20 of the pocket hole drill guides 10.

Figures 3C, 3D:
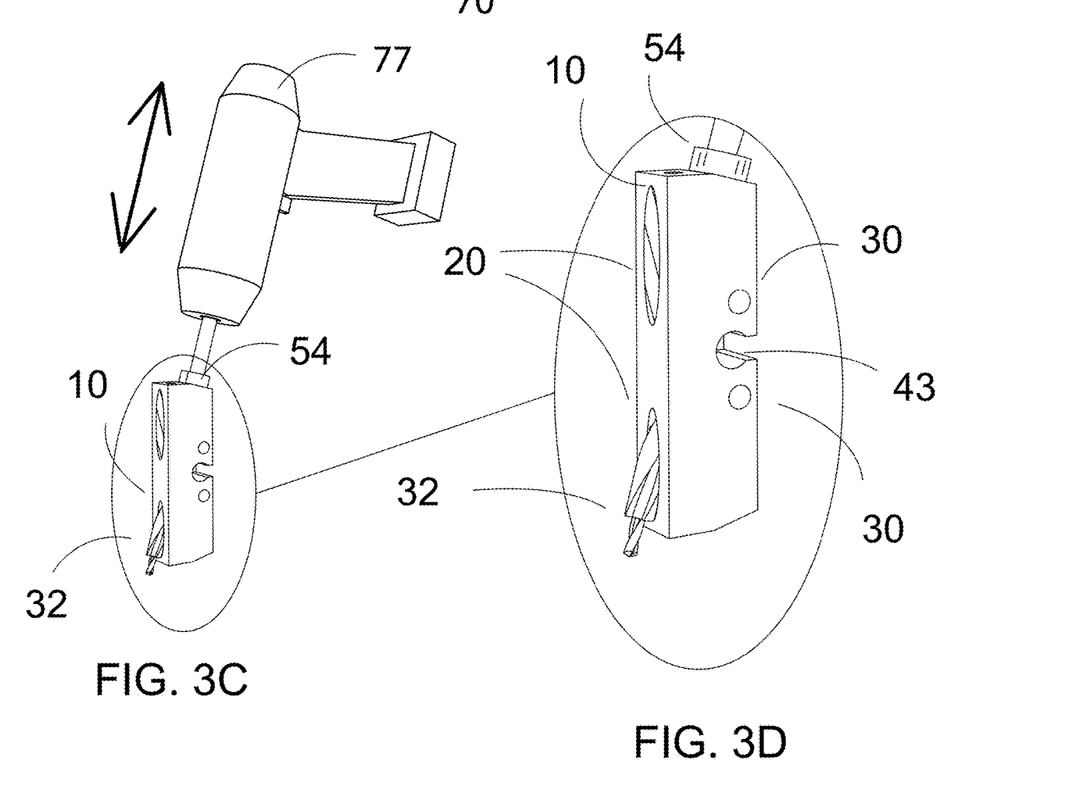
FIG. 3C is a perspective view of the pocket hole drill guide of this invention highlighting a drill with a drill bit thereon passing through a drill guide channel.
FIG. 3D is an enlarged view of one of the drill guides show in FIG. 3C.

FIG. 3C is a perspective shown from the contact face 20 of the pocket hole drill guide 10 illustrating a generic hand drill 77 and a drill bit 32 inserted through and exiting therefrom a guide channel 62, 78.

FIG. 3D is an enlarged view of FIG. 3C illustrating the first and second mounting channels 30 on the top and bottom of the enlarged mounting channel 43, also showing a slot therein. Additionally, a drill bit 32 is shown passing through the entirety of a guide channel 54 and extending therefrom.

Figures 4A, 4B, 4C, 4D, 4E, 4F, 4G:
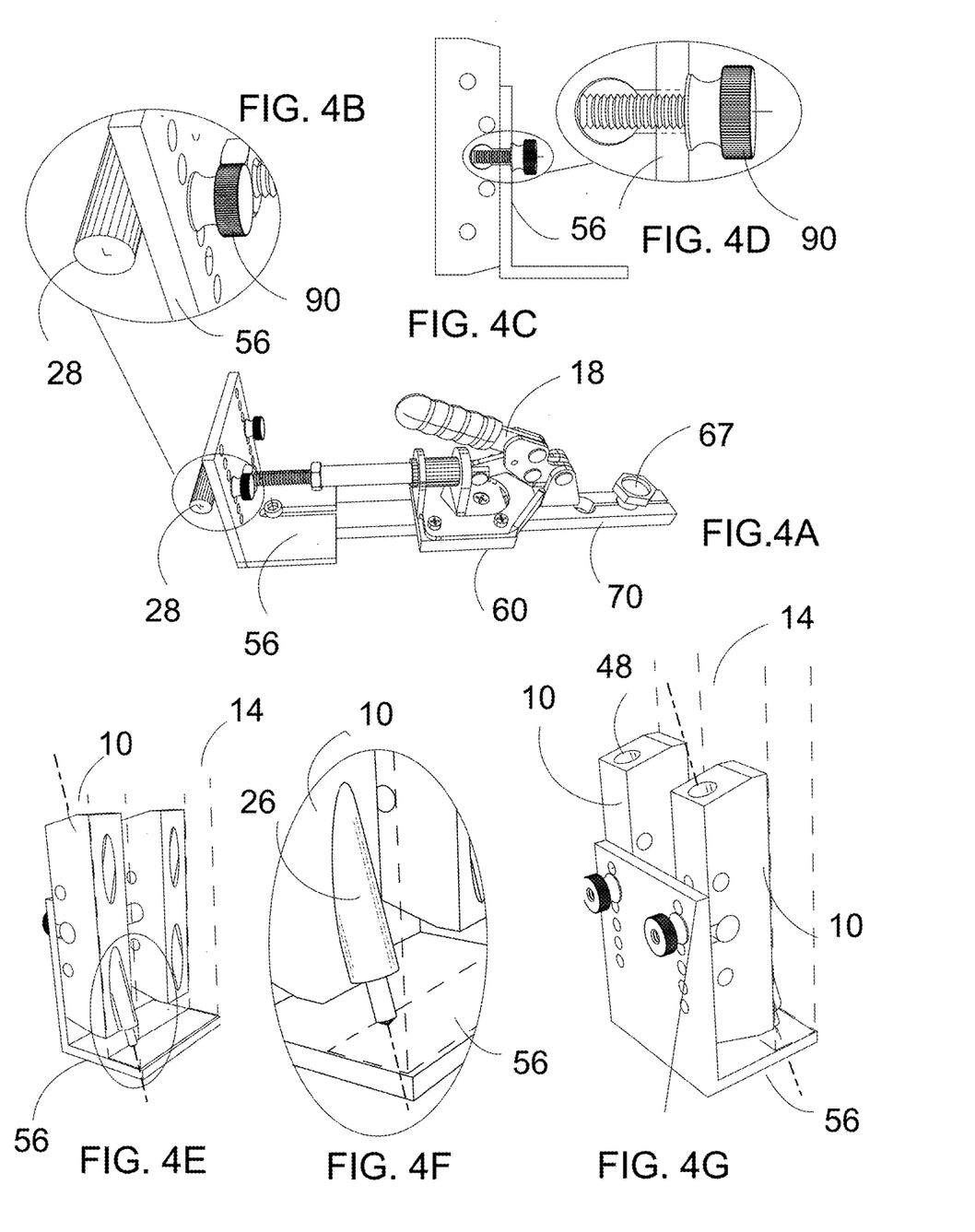
FIG. 4A is a perspective view of a toggle clamp interacting with an L-shaped extrusion mounted to a rod for illustration without pocket hole drill guides.
FIG. 4B is an enlarged view of the rod secured to the L-shaped extrusion bracket with a thumb screw.
FIG. 4C is an side view of a L-shaped extrusion bracket with a thumb screw interacting the enlarged mounting channel.
FIG. 4D is an enlarged side view of a thumb screw.
FIG. 4E is a perspective view of two pocket hole drill guides shown from the contact face side of the drill guides.
FIG. 4F is an enlarged view of FIG. 4E.
FIG. 4G is a perspective view of the pocket hole drill guide blocks shown from the top face of the drill guides, connected to a L-shaped extrusion bracket by way of thumb screws.

FIG. 4A is a perspective view of a toggle clamp 18, L-shaped extrusion bracket 56 and a miter bar 70. The toggle clamp 18 rests on a ⅜" spacer 60 that is secured to the miter bar 70 which is secured with a bar locking mechanism 67. The spacer 60 will allow for more clearance and adjusts where upon the L-shaped extrusion bracket 56 face the toggle clamp 18 contacts. The adjustable threaded shaft of the toggle clamp 75 is secured to a face of the L-shaped extrusion bracket 56. The adjustable threaded shaft of the toggle clamp 72 allows the clamping pressure on the workpiece 14 to be adjusted.

FIG. 4B is an enlarged view of the rod 28 secured to a face of the L-shaped extrusion bracket 56 utilizing an attachment method of a thumb screw 90. FIG. 4C is side of the pocket hole drill guide 10 secured to the vertical leg of a L-shaped extrusion bracket 56 with the thumb screw 90. FIG. 4D is an enlarged view of the rod 28, and the L-shaped extrusion bracket 56 illustrating the thumb screw 90 affixing the rod 28 to the second face of the L-shaped extrusion bracket 56.

FIG. 4E and FIG. 4F are a perspective view of two pocket hole drill guides 10 shown from the contact face 20 side. The L-shaped extrusion bracket 56 is positioned with the base leg under the pocket hole drill guides 10 for portable use on the workpiece 14. Additionally, a marking device 26 may be inserted within a guide channel to mark a workpiece 14.

FIG. 4G illustrates the two 15-degree diameter guide channels of the pocket hole drill guides 10 shown from the entry hole 48 side of the pocket hole drill guides 10. The L-shaped extrusion bracket 56 is connected to the pocket hole drill guides 10 by way of thumb screws 90 and applies horizontal pressure against a workpiece 14 to allow for a quick, repeatable, and accurate application of drilling in pocket holes.

FIG. 5A is a perspective view of a toggle clamp 18 resting on a ⅜" spacer 60 that is secured to a miter bar 70. The threaded shaft of the toggle clamp 75 which adjusts the jig clamping pressure is secured to the first face of the L-shaped extrusion bracket 56.

FIG. 5B and FIG. 5C are a perspective view of the toggle clamp 18 and clamping mechanism thereof. It is illustrated that a 3" by 3" L-shaped aluminum back extrusion 25 secured to a multi-slot extrusion 97 that has multiple T-slots 39 with thumb nuts 36. The multi-slot extrusion 97 is secured to a miter bar 70.

FIG. 5D is a perspective view of a miter bar 70 with multiple holes for flat head bolts or screws 38 and flat nuts 64. FIG. 5E is an enlarged view of a flat head screw 28 and a flat nut 64.

FIG. 5F is a perspective view of a multi-slot extrusion 97 with multiple T-Slots 39 for engaging with a L-shaped extrusion bracket 56 or a miter bar 70.

FIG. 5G is a perspective view of the 3" by 3" L-shaped aluminum back extrusion 25 secured to a multi-slot extrusion 97 that has multiple T-slots 39 with thumb nuts 36.

Figure 5H:
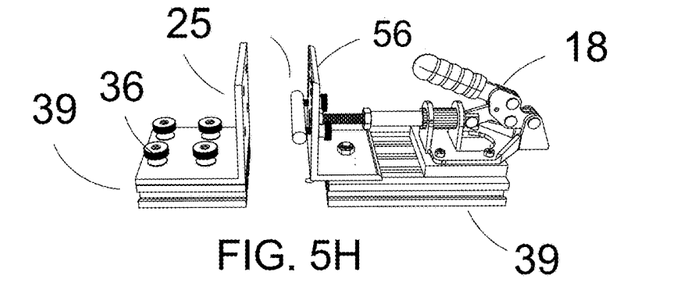
FIG. 5H is a perspective view of an L-shaped extrusion bracket which is secured atop a multi-slot extrusion.

FIG. 5H is a perspective view of the clamping mechanism 91 of the toggle clamp 18 which further includes an L-shaped extrusion bracket 56. Also shown, the toggle clamp 18 is secured to a multi-slot extrusion 97.

Figures 6A, 6B, 6C, 6D, 6E, 6F, 6G:
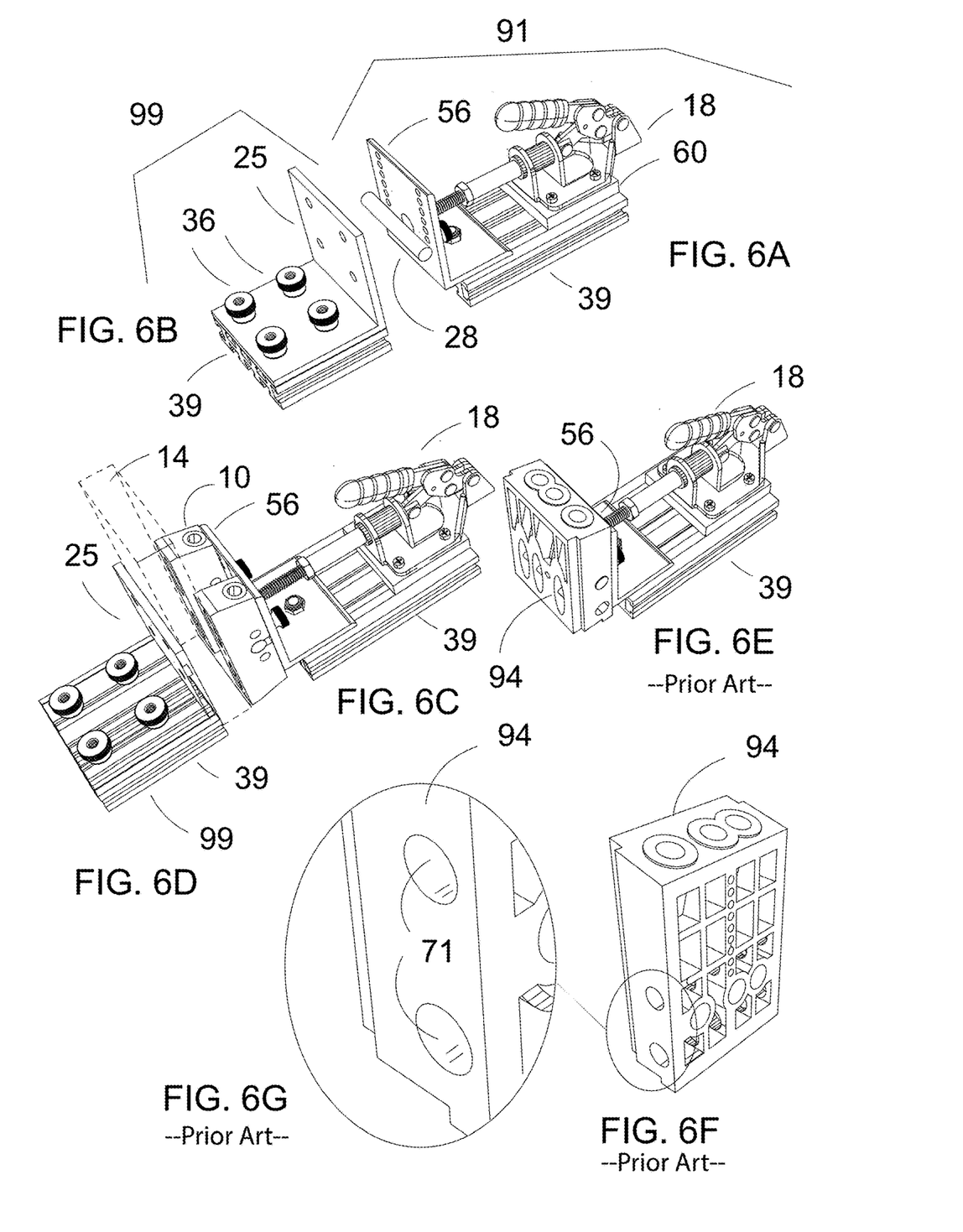
FIG. 6A is a perspective view of the toggle clamp of the pocket hole drill guide system secured to the top of a multi-slot extrusion.
FIG. 6B is a perspective view of an L-shaped extrusion bracket attached to a multi-slot extrusion.
FIG. 6C is a perspective view of the clamping mechanism of a toggle clamp, engaged with a L-shaped extrusion bracket connected with two dual hole drill guides secured thereon.
FIG. 6D illustrates an L-shaped extrusion bracket affixed to a multi-slot extrusion.
FIG. 6E is a perspective view of the clamping mechanism of the pocket hole illustrated in FIG. 6A with a generic drill guide block.
FIG. 6F is an enlargement of FIG. 6E illustrating holes that may accept a rod used to secure a generic drill guide block.
FIG. 6G is a perspective view of a generic drill guide block.

FIG. 6A is a perspective view of the clamping mechanism 91 of a toggle clamp 18 secured to the top of multi-slot extrusion 97.

FIG. 6B is a perspective view of the 3" by 3" L-shaped aluminum back extrusion 25 secured to a multi-slot extrusion 97 that has multiple T-slots 39 secured thereon with thumb nuts 36. The unit functions as a pressure plate 99 when the workpiece 14 is secured for a drilling operation.

FIG. 6C is a perspective view of the clamping unit 91 of a toggle clamp 18 wherein a L-shaped extrusion bracket 56 is affixed to pocket hole drill guides 10. The contact faces 20 of the pocket hole drill guides 10 abut against the workpiece 14, and turning to FIG. 6D, the first face of the L-shaped aluminum back extrusion 25 abuts the same workpiece 14 at a position opposite the contact faces 20 of the pocket hole drill guides 10.

FIG. 6E-FIG. 6G is a perspective view of and generic drill guide block 94, which does not have intersection guide channels.

Understandably, the present invention has been described above in terms of one or more preferred embodiments and methods. It is recognized that various alternatives and modifications may be made to these embodiments and methods that are within the scope of the present invention. Various alternatives are contemplated as being within the scope of the present invention. It is also to be understood and appreciated that, although the foregoing description and drawings describe and illustrate in detail one or more preferred embodiments of the present invention, to those with skill in the art to which the present invention relates, the present disclosure will suggest many modifications and constructions, as well as widely differing embodiments and applications without thereby departing from the spirit and scope of the invention and method disclosed thereof.

What is claimed is:

1. A pocket hole drill guide comprising:
   a central base member;
   wherein the central base member comprises a first end, a second end, a first side wall, a second side wall, a contact face, and a top face;
   a three-tenths inch diameter guide channel extending through the central base member first end, said three-tenths inch diameter guide channel further extending through the central base member contact face, further comprising a steel bushing positioned within the three-tenths inch diameter guide channel;
   a three hundred seventy-five thousandths inch diameter guide channel extending through the central base member second end, said three hundred seventy-five thousandths inch diameter guide channel further extending through the central base member contact face, further comprising a steel bushing positioned within the three hundred seventy-five thousandths inch diameter guide channel;
   wherein the three-tenths inch diameter guide channel and the three hundred seventy-five thousandths inch diameter guide channel intersect within the central base member; and further comprising a first positioning channel and a second positioning channel, the first positioning channel extending from the central base member first side wall through the central base member second side wall, and the second positioning channel extending from the central base member first side wall through the central base member second side wall.

2. The pocket hole drill guide of claim 1, further comprising an enlarged mounting channel located between the two positioning channels, said enlarged mounting channel extending from the central base member first side wall through the central base member second side wall.

3. The pocket hole drill guide of claim 2, further comprising a rod with a first end and a second end, said rod positioned within the enlarged mounting channel and extending therefrom.

4. The pocket hole drill guide of claim 3, further comprising an L-shaped extrusion bracket coupled to the top face of the central base member by way of a thumb screw.

5. The pocket hole drill guide of claim 4, further comprising a second pocket hole drill guide, wherein the rod is positioned within the enlarged mounting channel of the second pocket hole drill guide.

6. The pocket hole drill guide of claim 5, further comprising a toggle clamp, said toggle clamp adapted to removably connect to the L-shaped extrusion bracket.

7. The pocket hole drill guide of claim 6, further comprising a miter bar, said miter bar affixed to the L-shaped extrusion bracket.

8. The pocket hole drill guide of claim 6, further comprising a multi-slot extrusion, wherein the L-shaped extrusion bracket is attached to the multi-slot extrusion with a thumb screw.

9. A pocket hole drill guide system for use with a workpiece, the pocket hole drill guide system comprising:
   a plurality of central base members, wherein each central base member comprises a second end, a first side wall, a second side wall, a contact face, and a top face;
   an enlarged mounting channel extending from each central base member first side wall through each central base member second side wall;
   a rod positioned within the enlarged mounting channel of all central base members;
   an L-shaped extrusion bracket having a first face, a second face, and a lower base face, wherein the second face of the L-shaped extrusion bracket is affixed to the rod with a plurality of thumb screws;
   a toggle clamp removably contacting the first face of the L-shaped extrusion bracket;
   a multi-slot extrusion comprising a plurality of T-slots, said multi-slot extrusion connected to the lower base face of the L-shaped extrusion bracket by way of a thumb screw;
   a three-tenths inch diameter guide channel extending through each central base member first end, said three-tenths inch diameter guide channel further extending through each central base member contact face;
   a three hundred seventy-five thousandths inch diameter guide channel extending through each central base member second end, said three hundred seventy-five thousandths inch diameter guide channel further extending through each central base member contact face; and
   wherein the three-tenths inch diameter guide channel of each central base member and the three hundred seventy-five thousandths inch diameter guide channel of each central base member intersect within the corresponding central base member.

10. The pocket hole drill guide system of claim 9, wherein the workpiece abuts the contact faces of the plurality of central base members.

11. The pocket hole drill guide system of claim 10, further comprising a second multi-slot extrusion and an L-shaped aluminum back extrusion comprising a first face, a second face, and a base member, wherein the L-shaped aluminum back extrusion is attached to the second multi-slot extrusion with Thumb Nuts, and wherein the first face of the L-shaped aluminum back extrusion abuts the workpiece at a position opposite the plurality of central base members.

12. The pocket hole drill guide system of claim 11, wherein the first multi-slot extrusion consists of T-slots.

* * * * *